United States Patent Office 3,325,462
Patented June 13, 1967

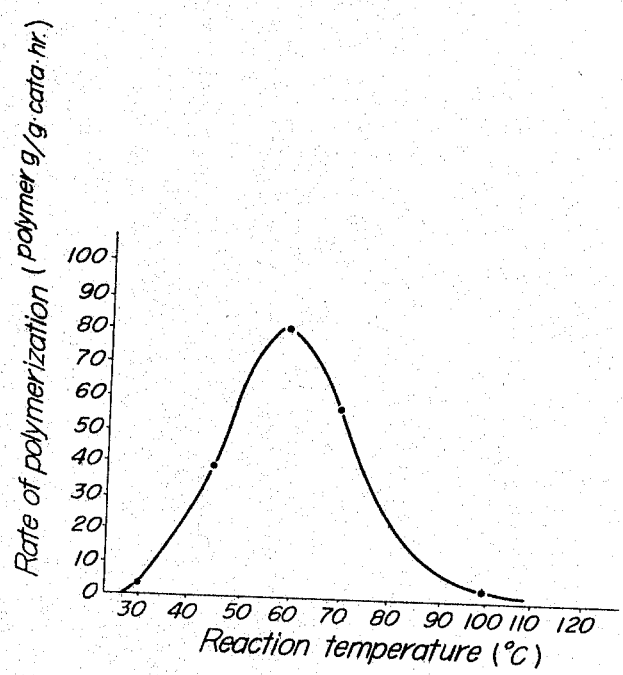

3,325,462
PROCESS FOR THE POLYMERIZATION OF PROPYLENE IN THE PRESENCE OF A CATALYST CONSISTING OF THE REACTION PRODUCT OF $TiCl_3$ AND AN ANTIMONY ALKYL HALIDE FURTHER REACTED WITH AN ALUMINUM ALKYL
Itsuho Aishima and Yukichi Takashi, Nobeoka-shi, Japan, assignors to Asahi Kasei Kogyo Kabushiki Kaisha, Osaka, Japan, a corporation of Japan
Filed Nov. 22, 1963, Ser. No. 325,671
Claims priority, application Japan, Nov. 24, 1962, 37/52,843
7 Claims. (Cl. 260—93.7)

The present invention relates to a process for the production of crystalline polypropylene in the presence of a novel catalyst.

Heretofore, various processes have been proposed for polymerizing olefins. Also the production of crystalline polypropylene has been realized by the discovery of heterogeneous catalysts in recent years.

Said heterogeneous catalysts comprise, in general, crystaline compounds of transition metals and organometallic compounds. It has been reported that the presence of both the regular surface of a crystalline transition metal compound dispersed in a heterogeneous state and the free organo-metallic compound in the polymerization system are indispensable in obtaining highly crystalline polypropylene according to the conventional methods.

We have been intensively studying processes for the production of crystalline polypropylene wherein propylene is polymerized in a system in which free organo-metallic compounds are not required, and finally have succeeded in establishing such a process based on the discovery of entirely novel catalysts.

The present invention provides a process for the production of crystalline polypropylene which comprises polymerizing propylene with the use of a catalyst in the polymerization system wherein any free aluminum alkyl or alkyl aluminum halide is absent; the catalyst containing titanium, aluminum and antimony in the atomic ratio of 1:0.5~0.5: 0.001~0.1, respectively, and being prepared by treating titanium trichloride in an inert reaction medium at a temperature between room temperature and 150° C. with a trialkyl antimony dihalide having the general formula $R_3SbX_2$, wherein R represents an alkyl group having from 1 to 4 carbon atoms and X represents a halogen atom, the amount of said trialkyl antimony dihalide being within the range of from 0.001 to 0.1 mole per mole of titanium trichloride, removing the inert reaction medium from the solid part of the resultant, subsequently allowing the remaining resultant to react at a temperature of between 30° C. and 100° C. in the absence of the inert reaction medium with an aluminum trialkyl having the general formula $AlR_3'$, wherein R' represents a lower alkyl gruop having from 1 to 7 carbon atoms, the amount of the aluminum trialkyl being within the range of from 1 to 6 mole per mole of titanium trichloride, separating only the solid reaction product from the resultant at room temperature and thereafter washing the solid product with a hot aromatic hydrocarbon to remove therefrom any residual organoaluminum compounds such as unreacted aluminum trialkyl and the like.

The active centers of the catalyst prepared under the special conditions as abovementioned are fixed on a single solid phase. Therefore, such catalyst works effectively by itself without any co-catalyst such as an organometallic compound present in the liquid phase of the polymerization system. The present invention, wherein such solid catalyst is employed for the production of the crystalline polymer from propylene does not involve in the polymerization step such dangerous procedures as handling simultaneously large amount of flammable inert solvent and monomer with organometallic compounds (e.g. trialkyl aluminium) that is spontaneously combustible. Furthermore the present invention is advantageous in the polymerization of propylene into a highly stereo-regular crystalline polymer by using only single phase solid catalysts, giving good reproducibility of the polymerization and maintaining safety and simplicity of handling.

The trialkyl antimony dihalide employed in the present invention has the general formula $R_3SbX_2$, and contains the same or different alkyl groups having from 1 to 4 carbon atoms and the same or different halogen atoms. Preferable examples include $(C_2H_5)_3SbCl_2$, $(C_2H_5)_3SbBr_2$, $(C_2H_5)_3SbI_2$, $(C_3H_7)_3SbCl_2$ and the like.

Preferable examples of the trialkyl aluminium employed in the present invention include triethyl aluminium, triisopropyl aluminium, tributyl aluminium, and the like.

For the homogeneous reaction of titanium trichloride with trialkyl antimony dihalide, it is necessary to contact both reactants in a reaction medium at a temperature between room temperature and 150° C. Preferred reaction medium is an aliphatic hydrocarbon or an inactive aromatic hydrocarbon in which the trialkyl antimony dihalide is soluble. Typical examples are n-hexane, isooctane, benzene, toluene, xylene, and the like. The amount of trialkyl antimony dihalide employed may be within the range of from 0.001 to 0.1 mole, preferably from 0.01 to 0.1 mole, per mole of titanium trichloride. When trialkyl antimony dihalide is employed in a lesser amount than abovementioned, the active catalyst cannot be obtained. On the other hand, when trialkyl antimony dihalide is employed in an amount exceeding the abovementioned range, the reaction with trialkyl aluminium proceeds too, thereby yielding poor activity.

Then, the reaction product obtained from titanium trichloride and trialkyl antimony dihalide by the abovementioned procedure is separated from the inactive reaction medium, and is subjected to a reaction with trialkyl aluminium at a temperature between 30° and 100° C., preferably between 40° and 70° C., in the absence of the inactive reaction medium.

The amount of the trialkyl aluminium employed therein must be sufficient. The desirable amount is within the range corresponding to from 1 to 6 mole per mole of titanium trichloride employed in the previous step. After the reaction under said conditions of the trialkyl aluminium with the reaction product obtained from titanium trichloride and the trialkyl antimony dihalide, only the solid product thereof is cooled as promptly as possible and separated from the liquid phase completely, then washed with a cold aromatic hydrocarbon solvent (e.g. benzene), and subsequently with a hot aromatic hydrocarbon (e.g. hot benzene). By such washings, the solid product becomes completely free of the residual organic aluminium compounds, such as trialkyl aluminium and the like, which are soluble in hydrocarbon solvents. Following these procedures, a black solid catalyst having a high activity for the polymerization of propylene is obtained.

The polymerizing activity of the thus obtained solid catalyst depends on the reaction temperature with trialkyl aluminum. If this temperature is below 30° C. or above 100° C., the resulting solid has a very poor activity for the polymerization. In order to prepare the catalyst having said excellent activity, the reaction temperature should be in the range between 40° and 70° C. For example, when the solid reaction product prepared, according to a procedure described later, at a temperature between 30° and 120° C. is employed as the catalyst for the polymerization of propylene in the same technique as in Example 1, the polymerization rate changes as shown in the accompanying figure which shows clearly the existence of the most suitable temperature range for preparing the catalyst.

The accompanying drawing shows the relation between the activity of the catalyst and its reaction temperature with trialkyl aluminum, the catalyst being prepared under the following condition.

0.1 mole of $TiCl_3$, and 0.001 mole of $Sb(C_2H_5)_3Cl_2$ are added to 250 ml. of benzene and allowed to react at 80° C. for 3 hr. Then benzene is completely removed therefrom by vacuum distillation. The resulting solid material is allowed to react with 0.50 mole of $Al(C_2H_5)_3$ at a varied temperature for 48 hrs. Only the solid product thereof is quickly cooled down, separated, washed with cold benzene, subsequently washed and extracted with hot benzene to remove any remaining benzene-soluble organic aluminium compounds completely, and dried in vacuum.

As is clear from the drawing, a substantially active catalyst is not obtained at reaction temperatures below 30° C. In such case, the crystalline polymer is hardly obtained by polymerizing propylene in the presence of the solid material only. When the reaction temperature is higher than 100° C., other undesirable reactions occur. Thus, the resulting solid material has very poor activity for the polymerization of propylene.

A more detailed explanation follows for the method for preparing the catalyst employed in the present invention.

Commercially available titanium trichloride contains a small amount of titanium tetrachloride which is required to be extracted and washed with benzene sufficiently or evacuated beforehand. 0.1 mole of such purified titanium trichloride and 0.001 mole of trialkyl antimony dihalide (e.g. $Sb(C_2H_5)_3Cl_2$ are added to 300 ml. of refined benzene, then allowed to react at 60 C. for 6 hrs. The benzene is completely removed therefrom by vacuum distillation.

15 g. of the resulting material is charged in a glass ampoule. Then, a trialkyl aluminium, for example, 50 g. of triethyl aluminum is added thereto. The glass ampoule is inserted without sealing in an autoclave equipped with a Bourdon gauge. The autoclave is placed in a stationary position in a water-bath kept at 60° C., the contents being allowed to react. The reaction proceeded promptly to generate 1200 ml. of gas after 24 hrs. The generated gas was found by gas chromatography to mainly comprise ethane.

After the reaction for 48 hrs., the reaction product is taken out under a nitrogen atmosphere washed with cold benzene at room temperature, and subsequently washed with a large amount of hot benzene until no residual alkyl aluminum compounds can be detected in the washing solution.

Then, the resultant solid reaction product is extracted with hot benzene for 48 hrs. under a nitrogen atmosphere employing an Asahina type continuous extraction apparatus, and thereafter dried in vacuum. Thus, 16 g. of the solid reaction product is isolated. The obtained product is not sticky and is in the form of an almost black powder. The analytical data is shown in Table 1.

TABLE 1

| Atom | Sb | Ti | Al | Cl | C | H | Total |
|---|---|---|---|---|---|---|---|
| Analytical value (wt. percent) | 0.44 | 34.39 | 6.00 | 43.27 | 11.26 | 1.90 | 97.26 |
| Atom ratio | 0.005 | 1.00 | 0.31 | 1.70 | 1.30 | 2.64 | |

NOTE.—(1) Methanol-insoluble content of the solid reaction product is 9.04%; (2) The content of Ti and Al contained in the methanol insoluble part is 2.33%, and 0.93%, respectively, based on the total sample. The methanol insoluble part is soluble in a mixed solution of sulfuric acid and hydrogen peroxide; (3) Compositions of the gas generated by hydrolysis of the solid reaction product are mainly ethane, ethylene and hydrogen; (4) The presence of polyethylene in the hydrolyzed sample is determined by infra-red analysis.

It is noteworthy, as is apparent from Table 1, that the ratio of chlorine atoms to titanium atoms included in the product is less than 2, and that a considerable amount of aluminium is present therein in spite of sufficient extraction and washing with hot benzene. And the X-ray diffraction shows increases in the backgrounds designating the presence of amorphous materials and evidence of a considerable amount of $TiCl_3$ starting material, and new reflection patterns which are not initially observed appear. The catalytically active structure of the compound or complex of the solid reaction product is very complicated and cannot be identified from these data. The following points, however, can be pointed out from various experimental results.

(1) The solid reaction product that has been sufficiently washed and extracted with hot benzene does not contain free trialkyl aluminium or alkyl aluminium halide. Crystals of aluminium trichloride cannot be detected therein by X-ray measurement.

(2) The presence of a considerable amount of $TiCl_3$ in the solid reaction product is recognized by X-ray measurement.

(3) The atom ratio of chlorine to titanium in the solid reaction product is approximately 2 or less, e.g. 1.70 as shown in Table 1. Therefore, summation of equivalents of chlorine and ethyl group is not more than 2.35 even assuming all the present carbons are contained as ethyl group. Assuming that the aluminum atom present in the solid reaction product combine preferably with 3 equivalents of present ethyl groups or chlorine atoms by $\sigma$-bonding, then summation of equivalents of chlorine and ethyl group which can be found with titanium atom is only 1.42.

(4) Most of the solid reaction product is soluble in methanol.

Considering the fact that the X-ray measurement designates the presence of a considerable amount of $TiCl_3$ in the solid reaction product, the foregoing facts lead to a conclusion that the compound or complex having 0~1 atom of chlorine bound to titanium atom should be present. Since such a compound or complex that can exist in a stable form at room temperature and which is soluble in methanol has not been known up to date, a certain novel compound or complex which satisfies the adequate valencies of aluminum, titanium and antimony might exist in the solid product. That is, it is concluded that the reaction product used in this invention as the catalyst for the polymerization of propylene might contain a partly novel compound or complex.

The polymerization of propylene employing the thus obtained solid reaction product as the catalyst is carried out in the absence of oxygen and water in an inactive polymerization solvent by contacting propylene with said solid polymerization catalyst at a suitable temperature to produce crystalline polypropylene. An embodied example of the present invention wherein the solid reaction product having the composition as shown in Table 1 is employed as the catalyst is explained as follows.

In a reaction vessel equipped with a stirrer, 54 parts (hereafter all parts being taken by weight) of refined n-hexane (an example of an inactive medium) corresponding to one-half volume of the vessel are charged, and 0.2 part of the catalyst of the solid reaction products shown in Table 1 is added and dispersed with agitation. After the temperature within the reaction vessel is raised to 60° C., propylene having 99.8% purity is charged therein keeping its partial pressure at 3 kg./cm.$^2$ and is polymerized for 3 hrs. Thereafter, the remaining propylene is removed after cooling the reaction vessel. Methanol is added to the reaction mixture in order to decompose the remaining catalyst. The obtained polymer is isolated by filtration, washed with methanol and water, and dried. Then, 35 parts of white solid polymer are obtained.

The resulting polymer is white and powdery. Its intrinsic viscosity in tetraline solution at 135° C. is 4.37. X-ray analysis shows that its crystallinity is 63%.

In the practice of the present invention, it is desired to employ a medium which is inactive in the polymerization reaction. The reaction medium inactive for the catalyst may be aliphatic hydrocarbons, aromatic hydrocarbon, or alicyclic hydrocarbon. Examples thereof include butane, n-hexane, n-heptane, iso-octane, benzene, toluene, cyclohexane, tetrahydronaphthalene, and the like. Such reaction medium may be used in any suitable amount depending on the polymerization technique, but less than 20 parts per part of propylene to be polymerized is usually preferred.

A preferred amount of the solid catalyst employed in the polymerization is between 0.01 and 2% by weight of propylene to be polymerized.

Preferable polymerization temperature to produce the polymer of good molecular weight characteristics at a high rate is between 15° and 120° C., especially between 40° and 80° C.

The pressure in the polymerization step may be selected suitably; a pressure in the range of from atmospheric pressure to 20 atm., is adequate for the purpose of the present invention.

*Example 1*

150 ml. of n-hexane was charged into a stainless steel autoclave of 300 ml. capacity under a purified nitrogen stream. 0.5 g. of the black solid reaction product having the composition shown in Table 1 was added thereto. Then the autoclave was closed. 21 g. of propylene was charged therein under pressure and polymerized at 70° C. (warmed with hot water) by shaking.

The internal pressure quickly lowered, and after one hour, the pressure decrease had stopped. The reaction product was poured into 500 ml. of methanol to decompose the catalyst, washed therewith, boiled with 30% hydrochloric acid-methanol, washed with water, and dried. Thus, 20 g. of white powdery polymer was obtained.

The rate of polymerization at a partial pressure of propylene of 3 kg./cm.$^2$, calculated from the change in the internal pressure, was 71 g./g. cata., hr. The specific gravity of obtained polymer was 0.91. The crystallinity of the polymer was 65% according to X-ray analysis.

What is claimed is:

1. A process for the production of crystalline polypropylene which comprises polymerizing propylene in the presence of a catalyst, said catalyst being free of free aluminum alkyl or alkyl aluminum halide, and containing titanium, aluminum, and antimony in the atomic ratio of 1:0.05 to 0.5:0.001 to 0.1 respectively; said catalyst being prepared by treating titanium trichloride with a trialkyl antimony dihalide of the general formula $R_3SbX_2$, in an inert reaction medium at a temperature between room temperature and 150° C., wherein R is an alkyl group having 1 to 4 carbon atoms, and X is a halogen atom, and where the molar ratio of trialkyl antimony dihalide to titanium trichloride is 0.001–0.1:1, separating the inert reaction medium from the solid resultant product of the reaction between the titanium trichloride and trialkyl antimony dihalide, reacting said solid resultant product at a temperature between 30° C. and 100° C. with an aluminum trialkyl of the general formula $AlR'_3$, wherein R' is a lower alkyl having 1 to 7 carbon atoms and where the molar ratio of aluminum trialkyl to titanium trichloride is 1–6:1, the product of the reaction comprising a solid product in a liquid phase, separating said solid product from said liquid phase at room temperature, and washing said solid product with a hot aromatic hydrocarbon to remove therefrom any organoaluminum compounds and thereby render said solid product free of free aluminum alkyl or alkyl aluminum halide.

2. A process as claimed in claim 1, wherein the trialkyl antimony dihalide is $(C_2H_5)_3SbCl_2$.

3. A process as claimed in claim 2, wherein the treatment of titanium trichloride with $(C_2H_5)_3SbCl_2$ is conducted at 60° C., the molar ratio of $(C_2H_5)_3SbCl_2$ to titanium trichloride being 0.01:1, the aluminum trialkyl being $Al(C_2H_5)_3$, which is reacted with the said solid resultant product at 60° C. in an amount which is in a molar ratio of 5:1 with the titanium trichloride.

4. A process as claimed in claim 1, wherein the inert reaction medium employed in the reaction between titanium trichloride and trialkyl antimony dihalide is a hydrocarbon selected from the group consisting of n-hexane and benzene.

5. A process as claimed in claim 1, wherein the inert reaction medium for the polymerization is a hydrocarbon selected from the group consisting of n-hexane, n-heptane, benzene, xylene, and cyclohexane.

6. A process as claimed in claim 1, wherein propylene is polymerized at a temperature between 40° C. and 80° C., and the partial pressure of propylene is maintained between 1 and 10 atm.

7. A process for the production of a polymerization catalyst containing titanium, aluminum and antimony in the atomic ratio of 1:0.05 to 0.5:0.001 to 0.1 respectively which comprises treating titanium trichloride with a trialkyl antimony dihalide of the general formula $R_3SbX_2$, in an inert reaction medium at a temperature between room temperature and 150° C., wherein R is an alkyl group having 1 to 4 carbon atoms, and X is a halogen atom, and where the molar ratio of trialkyl antimony dihalide to titanium trichloride is 0.001–0.1:1, separating the inert reaction medium from the solid resultant product of the reaction between the titanium trichloride and trialkyl antimony dihalide, reacting said solid resultant product at a temperature between 30° C. and 100° C. with an aluminum trialkyl of the general formula $AlR'_3$, wherein R' is a lower alkyl having 1 to 7 carbon atoms, and where the molar ratio of aluminum trialkyl to titanium trichloride is 1–6:1, the product of the reaction comprising a solid product in a liquid phase, separating said solid product from said liquid phase at room temperature, and washing said solid product with a hot aromatic hydrocarbon to remove therefrom any organoaluminum compounds and thereby render said solid product free of free aluminum alkyl or alkyl aluminum halide.

References Cited

UNITED STATES PATENTS

| | | | |
|---|---|---|---|
| 3,014,016 | 12/1961 | Natta | 260—93.7 |
| 3,047,557 | 7/1962 | Rust | 260—93.7 |
| 3,207,734 | 9/1965 | Tsunoda | 260—93.7 |

FOREIGN PATENTS

| | | |
|---|---|---|
| 608,467 | 3/1962 | Belgium. |

JOSEPH L. SCHOFER, *Primary Examiner.*

M. B. KURTZMAN, *Assistant Examiner.*